W. G. NASH.
SIGNALING DEVICE FOR AUTOMOBILES.
APPLICATION FILED SEPT. 18, 1909.

977,215.

Patented Nov. 29, 1910.

2 SHEETS—SHEET 1.

WITNESSES
E. G. Bromley
Geo. Hosker

INVENTOR
William G. Nash
BY
Munn & Co.
ATTORNEYS

W. G. NASH.
SIGNALING DEVICE FOR AUTOMOBILES.
APPLICATION FILED SEPT. 18, 1909.
977,215.
Patented Nov. 29, 1910.
2 SHEETS—SHEET 2.
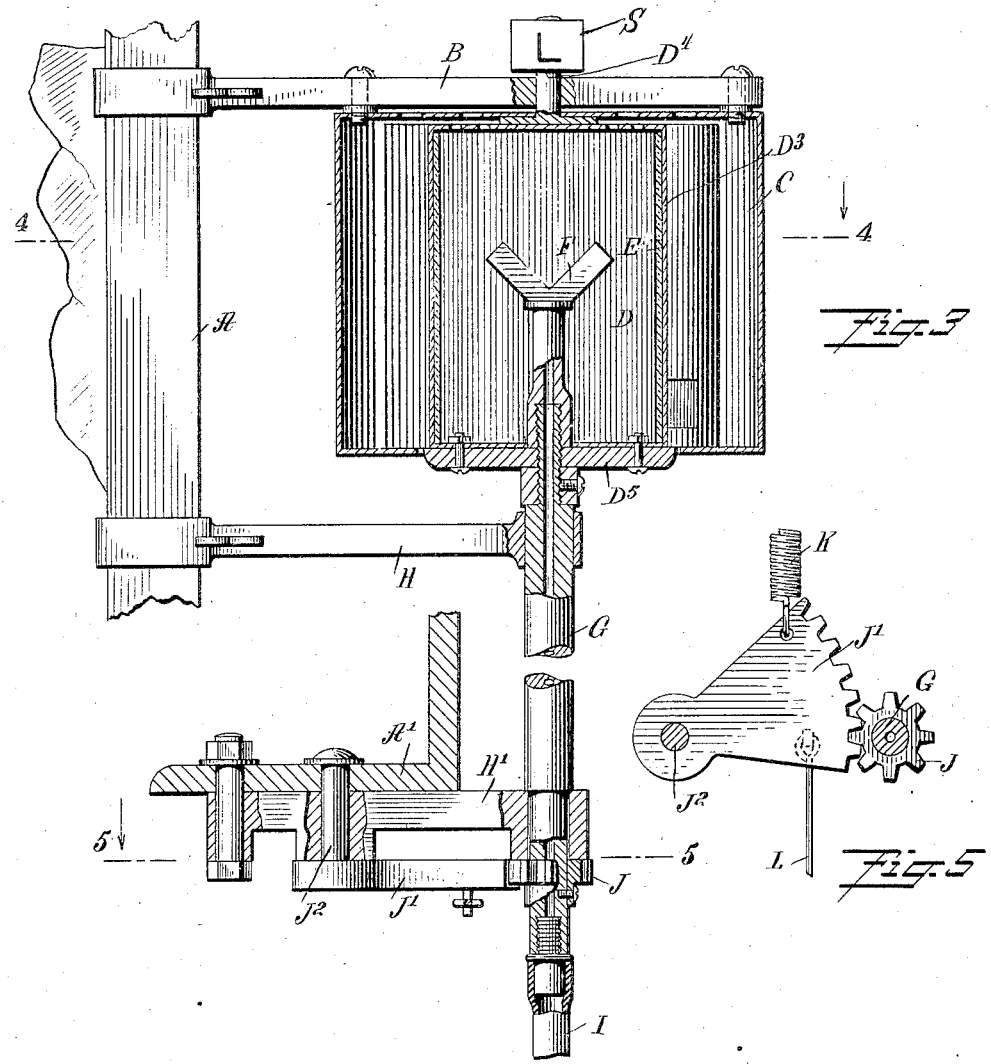
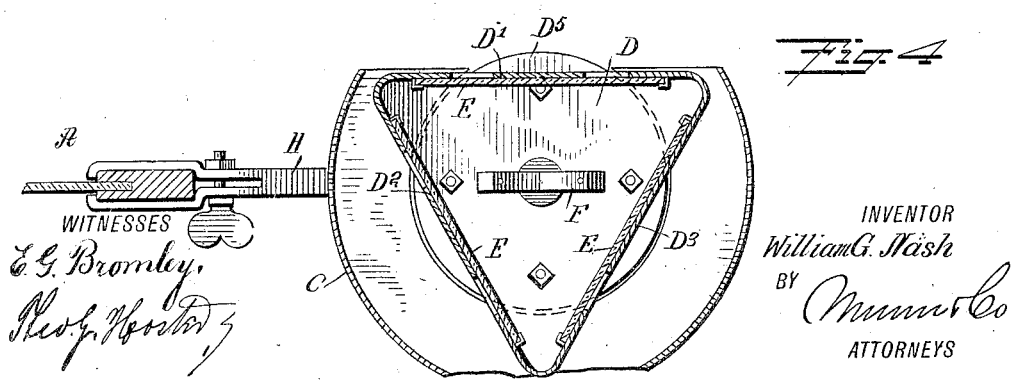

UNITED STATES PATENT OFFICE.

WILLIAM GARDINER NASH, OF DAYTONA, FLORIDA.

SIGNALING DEVICE FOR AUTOMOBILES.

977,215.   Specification of Letters Patent.   Patented Nov. 29, 1910.

Application filed September 18, 1909. Serial No. 518,388.

*To all whom it may concern:*

Be it known that I, WILLIAM G. NASH, a citizen of the United States, and a resident of Daytona, in the county of Volusia and State of Florida, have invented a new and Improved Signaling Device for Automobiles, of which the following is a full, clear, and exact description.

The object of the invention is to provide a new and improved signaling device, more especially designed for use on automobiles and other vehicles, and arranged to signal to vehicles or pedestrians or other persons in the front or in the rear of the vehicle, in what direction the vehicle intends to turn, to avoid collision and to prevent persons from being run over.

In practice, I prefer to use one signaling device at the front and a similar signaling device at the rear of the vehicle, both devices being simultaneously actuated by the chauffeur to display the desired signal, each device having a fixed casing provided with a display opening and a revoluble sign within the said casing, and having each of its sides provided with signs or other signaling means adapted to be displayed in the said casing opening, to thus give the signal at the front and rear of the vehicle.

A practical embodiment of the invention is represented in the accompanying drawings forming a part of this specification, in which similar characters of reference indicate corresponding parts in all the views.

Figure 1:
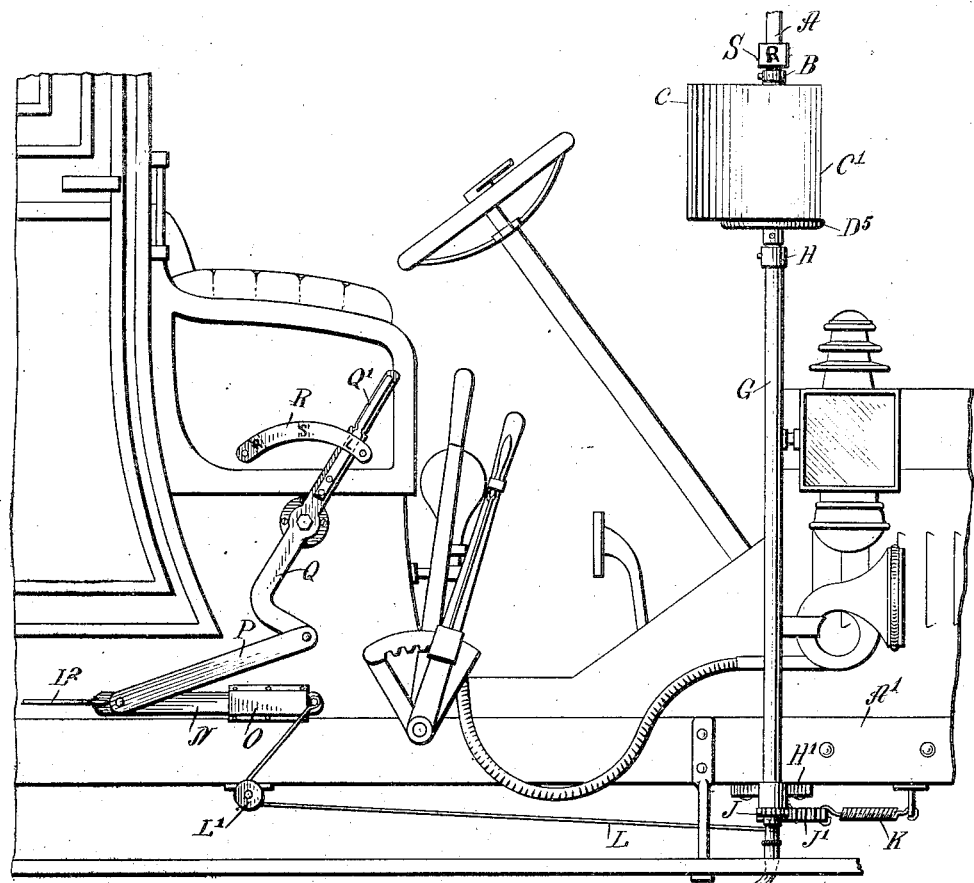
Figure 2:
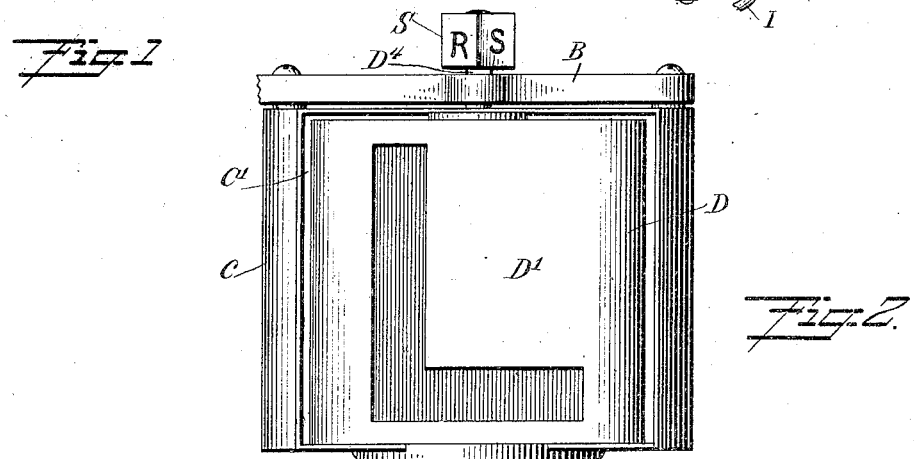

Figure 1 is a side elevation of the improvement as applied to an automobile; Fig. 2 is an enlarged front elevation of the casing and the sign contained therein; Fig. 3 is an enlarged cross section of the signaling device as applied; Fig. 4 is a sectional plan view of the same on the line 4—4 of Fig. 3; and Fig. 5 is a similar view of the same on the line 5—5 of Fig. 3.

On the dashboard, or on the frame A of the wind shield, of an automobile or other vehicle, is attached a bracket B, from which depends a casing C having a display opening C' at the front, and within the said casing C is arranged a sign D in the form of a casing, triangular in sectional plan view, and having each of its sides D', D², D³ cut out in the form of a letter or other signaling means, the letters being preferably R, L and S, standing for "Right," "Left" and "Straight," respectively. Thus when the letter S is displayed in the opening C', it indicates that the vehicle is going to travel straight ahead, and when the sign D is turned to display the side having the letter R, it indicates that the vehicle is going to turn to the right, and when the sign D is turned to show the letter L in the double opening C' then it indicates that the vehicle is going to turn to the left. In practice, the cut-out portions forming the letters in the sides D', D², D³ are covered by a glass E, preferably of a red color, and within the sign is arranged a gas burner F or a lamp, to illuminate the sign in the night so that the signaling letters are readily visible at a distance. The top of the sign D is provided with a trunnion D⁴, extending through the top of the casing C and journaled in a suitable bearing formed in the bracket B. The bottom of the sign D is attached to a base D⁵, secured to a vertically-disposed hollow shaft G, journaled in suitable bearings arranged on brackets H and H', of which the bracket H is attached to the frame A while the bracket H' is secured to the body A' of the vehicle, as plainly indicated in Figs. 1 and 3. The lower end of the hollow shaft G is connected with a gas supply pipe I, connected with a gas tank or the like, so as to supply the burner F with gas, to permit the use of the signaling device during the night, as previously explained.

On the shaft G is secured a pinion J in mesh with a segmental gear wheel J', fulcrumed at J² on the frame A' and pressed on by a spring K attached to the frame A', as indicated in Fig. 1. A cord or a cable L is connected with the segmental gear wheel J' and extends over a pulley L', to connect with one end of a slide N, mounted to slide in a suitable bearing O, attached to the frame A' of the vehicle. A similar cord or cable L² connects with the other end of the slide N, to lead to the segmental gear wheel J' of the signaling device, arranged on the rear of the vehicle, and which signaling device is identical in construction with the one described, the only difference being that the display opening of the casing C faces rearwardly instead of forwardly, so that the sides D', D², D³ of the sign D contained in this casing are displayed in a rearward direction to signal the following vehicles. The slide N is pivotally connected by a link P with a hand lever Q under the control of the chauffeur in charge of the vehicle, and the said hand lever Q is provided with a locking lever Q' adapted to engage a notched segment R, as indicated in Fig. 1. Now by the chauffeur unlocking the hand lever Q and shifting the same to one of three positions, a corresponding side D', D² or D³ is moved into display position in the opening C' of the casing D for the purpose previously explained.

Although I have described the use of two signaling devices on the ends of the vehicle, it is evident that only one such signaling device may be employed at either the front or rear end of the vehicle.

The position of the sign D is indicated to the chauffeur by letters on the segment R corresponding to the letters on the sides D', D² and D³ of the sign D. A three-cornered knob S similarly lettered may be secured to the trunnion D⁴, the letters on the knob being arranged so that the same letter which is displayed on the sign D faces the chauffeur. The letters on the sign D are sufficiently large to be readily visible a distance ahead.

Having thus described my invention, I claim as new and desire to secure by Letters Patent:

A device of the character specified, comprising an outer casing having a display opening, a shaft journaled vertically in the casing, an inner casing secured to the shaft, said casing being polygonal in cross section and having cut out portions in its faces forming symbols, a burner within the casing for illuminating the same, said shaft being hollow and the burner being connected with the shaft, a fuel supply pipe for the burner connected with the shaft outside of the casing, a hand lever, a connection between the said lever and the shaft for rotating the shaft in one direction, and a spring for returning the shaft.

In testimony whereof I have signed my name to this specification in the presence of two subscribing witnesses.

WILLIAM GARDINER NASH.

Witnesses:
F. N. CONRAD,
W. L. DIGGETT.